US012804503B2

(12) United States Patent
Selvaganapathy et al.

(10) Patent No.: US 12,804,503 B2
(45) Date of Patent: Nov. 17, 2026

(54) ENHANCED SIGNALLING PROCEDURE FOR SCG MOBILITY IN DEACTIVATED STATE USING CONDITIONAL CONFIGURATION

(71) Applicant: Nokia Technologies Oy, Espoo (FI)

(72) Inventors: Srinivasan Selvaganapathy, Bangalore (IN); Amaanat Ali, Espoo (FI); Subramanya Chandrashekar, Bangalore (IN); Ahmad Awada, Munich (DE); Faranaz Sabouri-Sichani, Aalborg (DK)

(73) Assignee: Nokia Technologies Oy, Espoo (FI)

( * ) Notice: Subject to any disclaimer, the term of this patent is extended or adjusted under 35 U.S.C. 154(b) by 269 days.

(21) Appl. No.: 18/701,915

(22) PCT Filed: Oct. 14, 2022

(86) PCT No.: PCT/EP2022/078686
§ 371 (c)(1),
(2) Date: Apr. 16, 2024

(87) PCT Pub. No.: WO2023/066807
PCT Pub. Date: Apr. 27, 2023

(65) Prior Publication Data

US 2024/0414602 A1 Dec. 12, 2024

(30) Foreign Application Priority Data

Oct. 21, 2021 (IN) ............................. 202141047973

(51) Int. Cl.
*H04W 36/36* (2009.01)
*H04W 36/00* (2009.01)
(Continued)

(52) U.S. Cl.
CPC ..... *H04W 36/362* (2023.05); *H04W 36/0058* (2018.08); *H04W 36/08* (2013.01); *H04W 36/324* (2023.05); *H04W 36/0069* (2018.08)

(58) Field of Classification Search
None
See application file for complete search history.

(56) References Cited

U.S. PATENT DOCUMENTS

2021/0235495 A1 7/2021 Xu et al.
2023/0007499 A1* 1/2023 Da Silva ............... H04W 16/18
(Continued)

OTHER PUBLICATIONS

"Revised WID on Further Multi-RAT Dual-Connectivity enhancements", 3GPP TSG RAN Meeting #88e, RP-201040, Agenda: 9.10.9, Huawei, Jun. 29-Jul. 3, 2020, 4 pages.
(Continued)

*Primary Examiner* — Benjamin Lamont
(74) *Attorney, Agent, or Firm* — Barta Jones, PLLC

(57) ABSTRACT

Techniques of cell change in a SCO DEACTIVATED state includes a master node configuring a user equipment with a partial Conditional PSCell Addition Change (CPAC) which only contain the configurations relevant for common channel access without any dedicated configurations. The improved technique proposes a modified CPAC configuration procedure to reduce the overall signalling messages and frequency of network communication, involved in UE switching between SCGs in SCG-DEACTIVATED state.

15 Claims, 7 Drawing Sheets

(51) Int. Cl.
*H04W 36/08* (2009.01)
*H04W 36/32* (2009.01)

(56) References Cited

U.S. PATENT DOCUMENTS

| | | | | |
|---|---|---|---|---|
| 2024/0008144 | A1* | 1/2024 | Van Der Velde ..... | H04W 76/15 |
| 2024/0073982 | A1* | 2/2024 | Wallentin .............. | H04W 76/15 |

OTHER PUBLICATIONS

"3rd Generation Partnership Project; Technical Specification Group Radio Access Network; Evolved Universal Terrestrial Radio Access (E-UTRA) and NR; Multi-connectivity; Stage 2 (Release 16)", 3GPP TS 37.340, V16.5.0, Mar. 2021, pp. 1-84.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Radio Access Network; NG-RAN; Xn application protocol (XnAP) (Release 16)", 3GPP TS 38.423, V16.5.0, Apr. 2021, pp. 1-461.

"Msc-generator", Sourceforge, Retrieved on Sep. 19, 2024, Webpage available at : https://sourceforge.net/projects/msc-generator/.

International Search Report and Written Opinion received for corresponding Patent Cooperation Treaty Application No. PCT/EP2022/078686, dated Feb. 7, 2023, 13 pages.

"(TP for CPAC BL CR to TS 38.423) CPAC Cancellation", 3GPP TSG-RAN WG3 Meeting #113-e, R3-214127, Agenda: 14.3, Samsung, Aug. 16-26, 2021, 16 pages.

"[AT113-e][230][eDCCA] Solution alternatives for SCG activation and deactivation (Huawei)", 3GPP TSG-RAN WG2#113-e, R2-2101966, Agenda: 8.2.2, Huawei, Jan. 25-Feb. 5, 2021, 33 pages.

* cited by examiner

ENHANCED SIGNALLING PROCEDURE FOR SCG MOBILITY IN DEACTIVATED STATE USING CONDITIONAL CONFIGURATION

RELATED APPLICATION

This application was originally filed as PCT Application No. PCT/EP2022/078686, filed on Oct. 14, 2022, which claims priority from IN application No. 202141047973, filed on Oct. 21, 2021, of which priority is claimed and is incorporated herein by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a user equipment from a master node in a network, the user equipment being connected to the master node and a source secondary node, partial configuration data representing a partial configuration for a set of primary secondary cells of a secondary cell group associated with the source secondary node, the secondary cell group being in a deactivated state, the partial configuration including a measurement identifier for the set of primary secondary cells. The method also includes evaluating at least one cell change criteria for the set of primary secondary cells. The method further includes, in response to the at least one cell change criteria being fulfilled, applying the partial configuration. The method further includes transmitting, to the master node, indication data representing an indication of a cell change to a new primary secondary cell of the set of primary secondary cells, the new primary secondary cell being in the deactivated state and being associated with a target secondary node.

According to an example implementation, an apparatus includes at least one processor and at least one memory including computer program code, the at least one memory and the computer program code configured to, with the at least one processor, cause the apparatus at least to receive, by a user equipment from a master node in a network, the user equipment being connected to the master node and a source secondary node, partial configuration data representing a partial configuration for a set of primary secondary cells of a secondary cell group associated with the source secondary node, the secondary cell group being in a deactivated state, the partial configuration including a measurement identifier for the set of primary secondary cells. The at least one memory and the computer program code are also configured to, with the at least one processor, cause the apparatus at least to evaluate at least one cell change criteria for the set of primary secondary cells. The at least one memory and the computer program code are further configured to, with the at least one processor, cause the apparatus at least to, in response to the at least one cell change criteria being fulfilled, apply the partial configuration. The at least one memory and the computer program code are further configured to, with the at least one processor, cause the apparatus at least to transmit, to the master node, indication data representing an indication of a cell change to a new primary secondary cell of the set of primary secondary cells, the new primary secondary cell being in the deactivated state and being associated with a target secondary node.

According to an example implementation, an apparatus includes means for receiving, by a user equipment from a master node in a network, the user equipment being connected to the master node and a source secondary node, partial configuration data representing a partial configuration for a set of primary secondary cells of a secondary cell group associated with the source secondary node, the secondary cell group being in a deactivated state, the partial configuration including a measurement identifier for the set of primary secondary cells. The apparatus also includes means for, in response to the at least one cell change criteria being fulfilled, applying the partial configuration. The apparatus further includes means for transmitting, to the master node, indication data representing an indication of a cell change to a new primary secondary cell of the set of primary secondary cells, the new primary secondary cell being in the deactivated state and being associated with a target secondary node.

According to an example implementation, a computer program product includes a computer-readable storage medium and storing executable code that, when executed by at least one data processing apparatus, is configured to cause the at least one data processing apparatus to receive, by a user equipment from a master node in a network, the user equipment being connected to the master node and a source secondary node, partial configuration data representing a partial configuration for a set of primary secondary cells of a secondary cell group associated with the source secondary node, the secondary cell group being in a deactivated state, the partial configuration including a measurement identifier for the set of primary secondary cells. The executable code, when executed by at least one data processing apparatus, is also configured to cause the at least one data processing apparatus to evaluate at least one cell change criteria for the set of primary secondary cells. The executable code, when executed by at least one data processing apparatus, is further configured to cause the at least one data processing apparatus to in response to the at least one cell change criteria being fulfilled, apply the partial configuration. The executable code, when executed by at least one data processing apparatus, is further configured to cause the at least one data processing apparatus to transmit, to the master node, indication data representing an indication of a cell change to a new primary secondary cell of the set of primary secondary cells, the new primary secondary cell being in the deactivated state and being associated with a target secondary node.

According to an example implementation, a method includes receiving, by a master node in a network from a source secondary node in the network, primary secondary cell data representing a set of primary secondary cells, the set of primary secondary cells not having dedicated resources and configuration for a user equipment in the network and being associated with the source secondary node, the user equipment being connected to the master node and a source secondary node, the set of primary secondary cells being in a deactivated state. The method also includes transmitting, by the master node to the user equipment, partial configuration data representing a partial configuration for the set of primary secondary cells, the partial configuration including a measurement identifier for the set of primary secondary cells.

According to an example implementation, an apparatus includes at least one processor and at least one memory including computer program code, the at least one memory and the computer program code configured to, with the at least one processor, cause the apparatus at least to receive, by a master node in a network from a source secondary node in the network, primary secondary cell data representing a set of primary secondary cells, the set of primary secondary cells not having dedicated resources and configuration for a user equipment in the network and being associated with the source secondary node, the user equipment being connected to the master node and a source secondary node, the set of primary secondary cells being in a deactivated state. The at least one memory and the computer program code are also configured to transmit, by the master node to the user equipment, partial configuration data representing a partial configuration for the set of primary secondary cells, the partial configuration including a measurement identifier for the set of primary secondary cells.

According to an example implementation, an apparatus includes means for receiving, by a master node in a network from a source secondary node in the network, primary secondary cell data representing a set of primary secondary cells, the set of primary secondary cells not having dedicated resources and configuration for a user equipment in the network and being associated with the source secondary node, the user equipment being connected to the master node and a source secondary node, the set of primary secondary cells being in a deactivated state. The apparatus also includes means for transmitting, by the master node to the user equipment, partial configuration data representing a partial configuration for the set of primary secondary cells, the partial configuration including a measurement identifier for the set of primary secondary cells.

According to an example implementation, a computer program product includes a computer-readable storage medium and storing executable code that, when executed by at least one data processing apparatus, is configured to cause the at least one data processing apparatus to receive, by a master node in a network from a source secondary node in the network, primary secondary cell data representing a set of primary secondary cells, the set of primary secondary cells not having dedicated resources and configuration for a user equipment in the network and being associated with the source secondary node, the user equipment being connected to the master node and a source secondary node, the set of primary secondary cells being in a deactivated state. The executable code, when executed by at least one data processing apparatus, is also configured to cause the at least one data processing apparatus to transmit, by the master node to the user equipment, partial configuration data representing a partial configuration for the set of primary secondary cells, the partial configuration including a measurement identifier for the set of primary secondary cells.

The details of one or more examples of implementations are set forth in the accompanying drawings and the description below. Other features will be apparent from the description and drawings, and from the claims.

DETAILED DESCRIPTION

The principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

The terminology used herein is for the purpose of describing particular embodiments only and is not intended to be limiting of example embodiments. As used herein, the singular forms “a”, “an” and “the” are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

Figure 1:
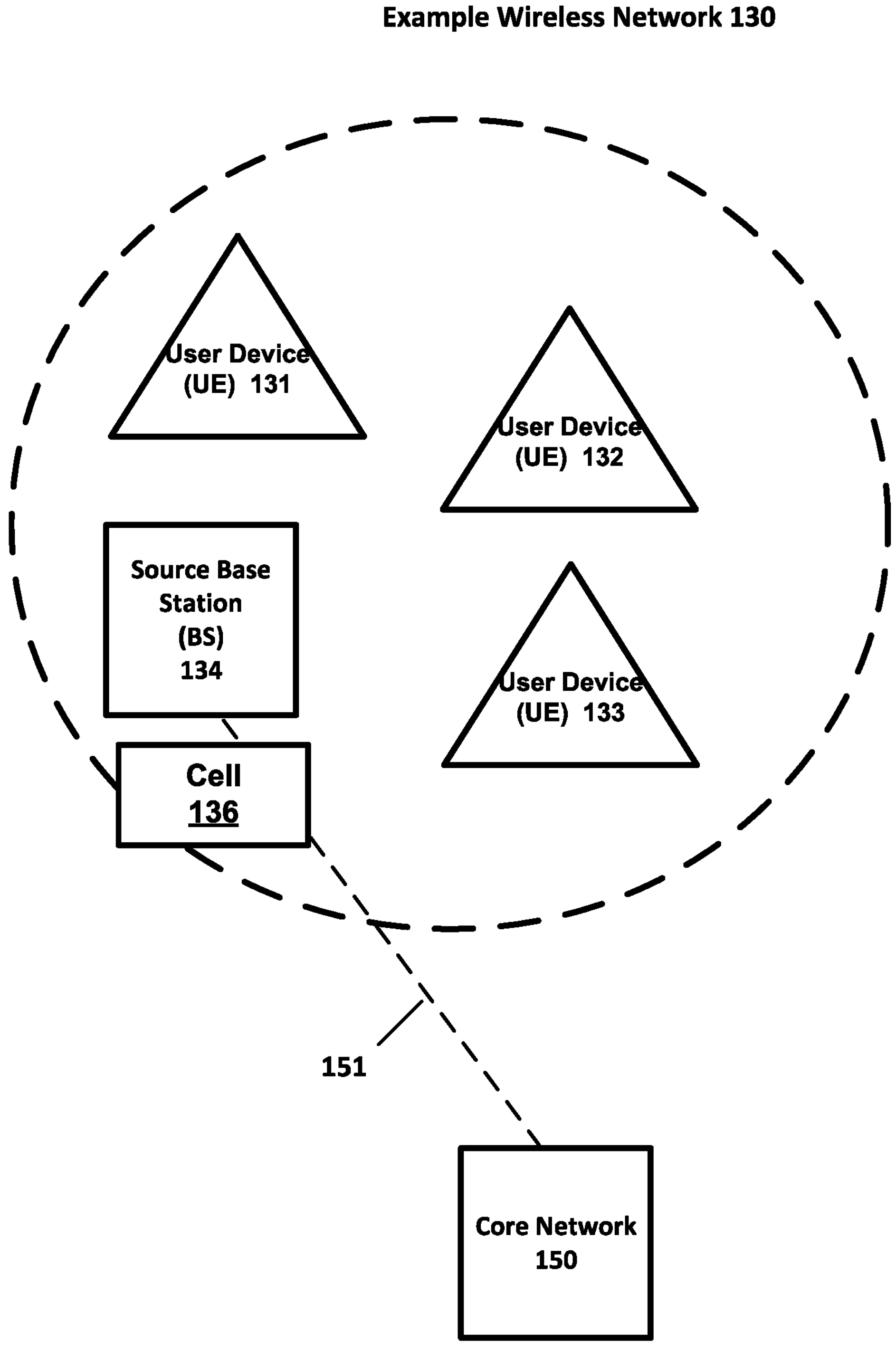
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, and 133, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e) Node B (eNB) also may be carried out by any node, server or host which may be operably coupled to a transceiver, such as a remote radio head. BS (or AP) 134 provides wireless coverage within a cell 136, including the user devices 131, 132 and 133. Although only three user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, a vehicle, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/serving cell change of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cm Wave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

The handover (HO) procedure for user equipment (UE) having dual connectivity (DC) is defined for the cases when the master cell group (MCG) is to be changed with or without secondary node (SN) change. Inter-Master Node (MN) handover with/without MN initiated SN change is used to transfer UE context data from a source MN to a target MN while the UE context at the SN is kept or moved to another SN. During an inter-MN handover, the target MN decides whether to keep or change the SN. There is a procedure for inter-MN handover with/without MN initiated SN change.

A conditional HO (CHO) procedure can also be used when the UE is having DC at the time of CHO preparation. In this case, the CHO preparation of target cell may consider including the same secondary cell group (SCG) in the preparation. When CHO is executed to target MN, the UE should release the source MN and source SN. The UE should then re-access the (same or different) SN which is configured as part of the CHO configuration.

Procedures for CHO with/without SN change are not yet defined. It is assumed that a source SN release request and SN release ACK are performed after a source MN receives an indication from a target MN that the UE has successfully accessed one of the potential target MNs (i.e., after the target MN receives a RRCReconfigurationComplete message from the UE).

SCG deactivation is introduced to benefit power saving when there is no high data traffic to use in SCG, but a fast reactivation is needed. The UE may perform RRM measurements on DEACTIVATED SCG and perform PSCell change, if required by the UE's mobility.

For a UE which is configured with dual connectivity with SCG in DEACTIVATED state the mobility between secondary cells consists of following steps.

- The UE reports RRM measurement report as per SCG measurement configuration via MN. NOTE: SRB3 cannot be used since the SCG is assumed to be deactivated (i.e., there is no uplink transmission possible unless the UE leaves the deactivated state).
- Based on the measurement report, network triggers the PSCell change procedure which involves inter-node messages across SNs for preparing dedicated configurations in target SN candidates but in DEACTIVATED state.
- The UE receives the PSCell change command and triggers Random access procedure to complete the procedure.

For UE which does not have any data activity, the above signalling messages are an overhead and lead to additional power consumption in UE on SCG which is configured in DEACTIVATED state. The issue is more predominant when the SCG cells are small cell deployments and UE is moving with higher speed where number of cell-change events per second is higher.

Figure 2:
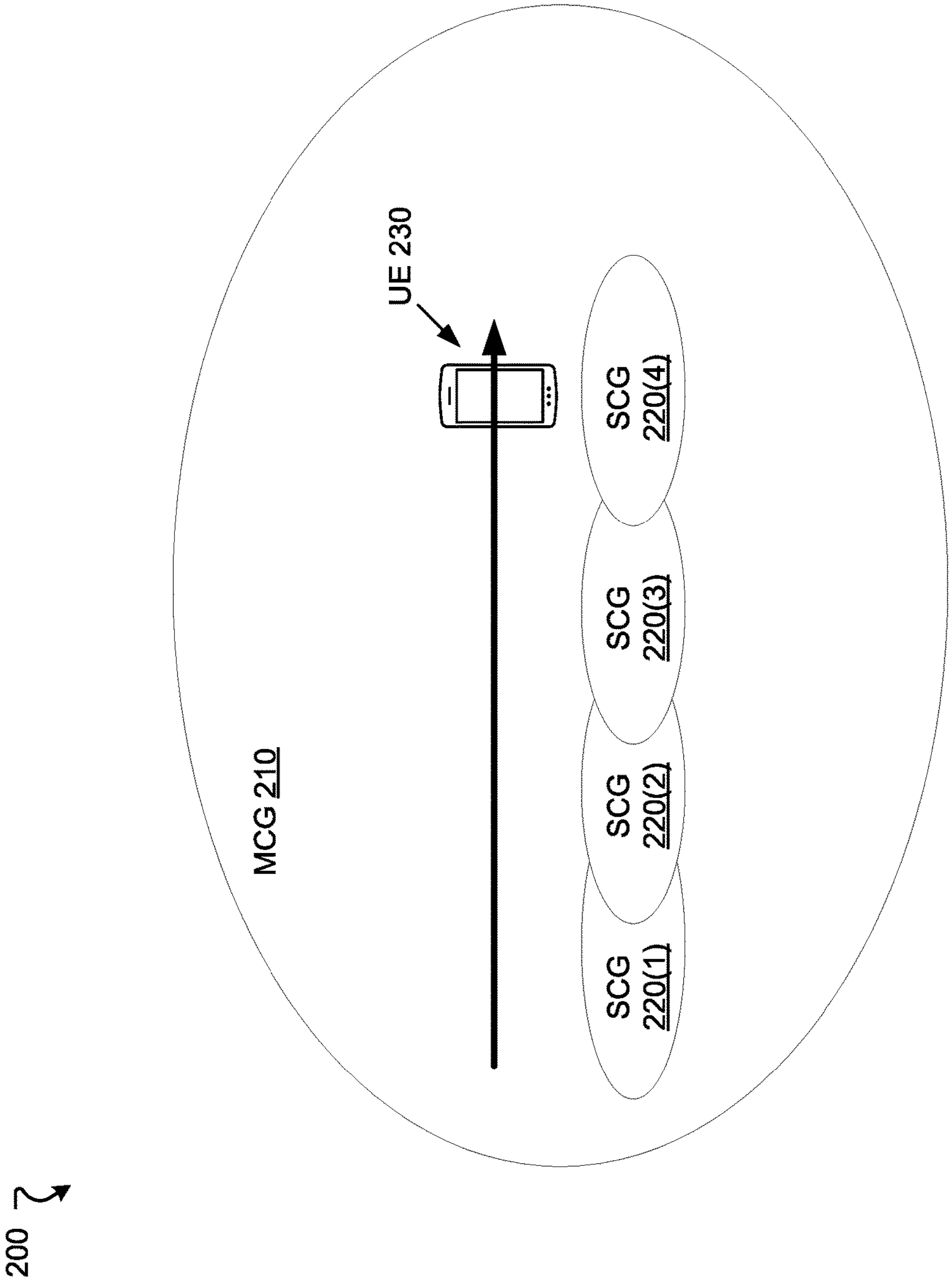
FIG. 2 is a diagram illustrating a scenario in which a UE in dual connectivity such that the UE is moving across several small SCG cells according to an example implementation.

FIG. 2 illustrates the problem. FIG. 2 is a diagram that illustrates a dual connectivity scenario 200 with a UE 230 moving across several small SCG cells 220 (1-4) within a MCG 210.

Figure 3:
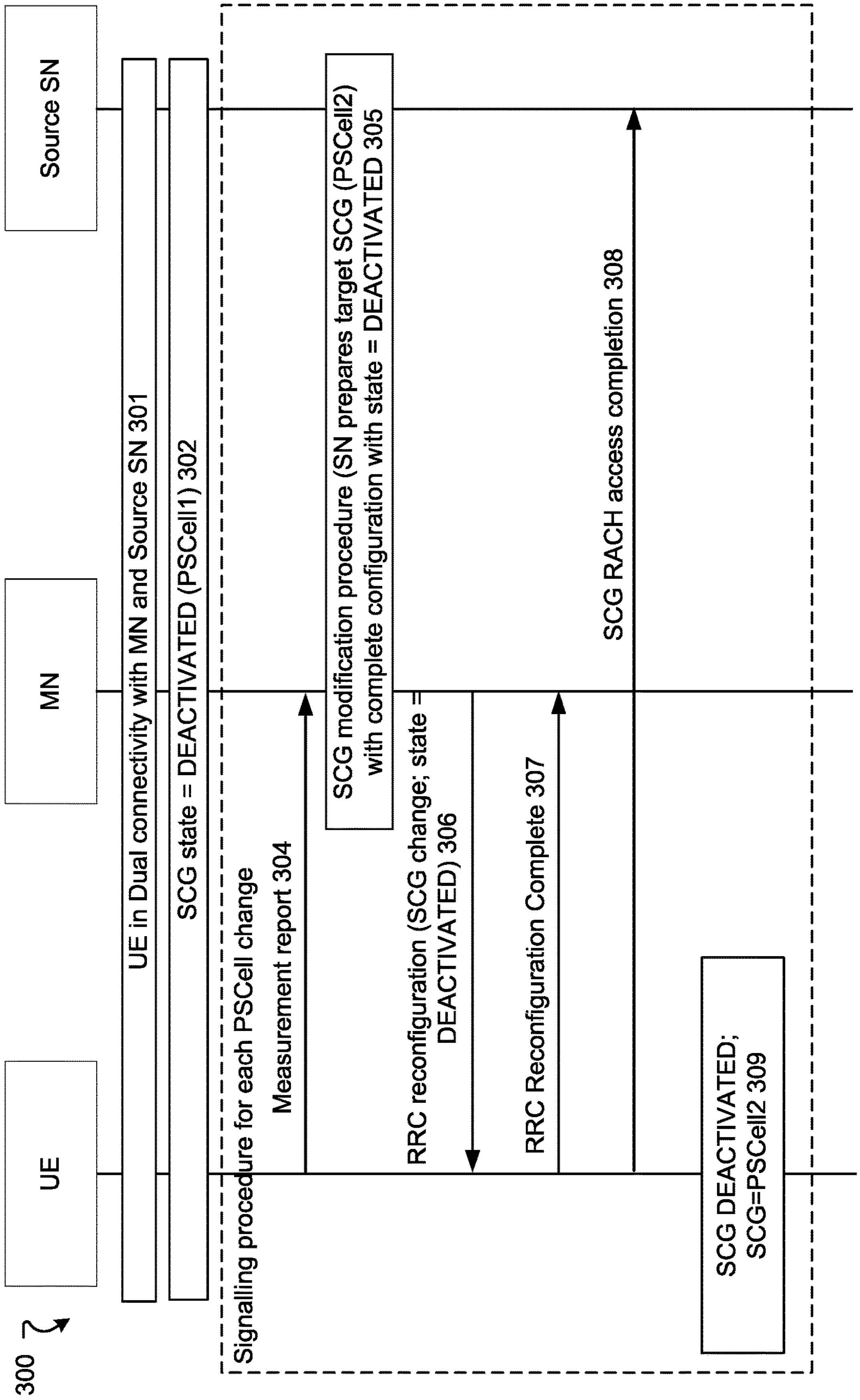
FIG. 3 is a sequence diagram illustrating a signalling procedure for deactivated SCG measurements, reporting, and change, according to an example implementation.

FIG. 3 is a sequence diagram representing a signalling procedure 300 for PSCell change when UE is in SCG-DEACTIVATED state. At 301 and 302, a UE is in DC mode with MN and source SN, with the SCG in a SCG-DEACTIVATED state. At 304, the UE sends the MN a measurement report. At 305, the SN prepares a target SCG with a SCG-DECTIVATED state. At 306, the MN transmits a RRCReconfiguration message with a change in the SCG to a target SCG in SCG-DEACTIVATED state. At 307, the UE transmits a RRCReconfigureComplete message to the MN. At 308, the UE transmits a RACH-Access-Complete message to the source SN. At 309, the UE is in a dual connectivity with the MN and the target SN in SCG-DEACTIVATED state.

In contrast to the above-described conventional approaches to cell change in a SCG DEACTIVATED state, an improved technique of cell change in a SCG DEACTIVATED state includes a master node configuring a user equipment with a partial Conditional PSCell Addition Change (CPAC) which only contain the configurations relevant for common channel access without any dedicated configurations. The improved technique proposes a modified CPAC configuration procedure to reduce the overall signalling messages and frequency of network communication, involved in UE switching between SCGs in SCG-DEACTIVATED state.

Advantageously, the above-described improved technique for switching between SCGs in a SCG-DECATIVATED state reduces the overall signalling messages and frequency of network communication involved in UE switching between SCGs in SCG-DEACTIVATED state.

The modified signalling procedure consists of the following.

- MN configures the UE with CPAC configurations for list (e.g., set) of PSCells which only contain the configurations relevant for common channel access without any dedicated configurations. Each configuration is linked to conditional measurement ID. This procedure can be triggered when MN/or source SN detects high mobility for a UE having an SCG in DEACTIVATED state.
  - This configuration also includes measurement events mapped to conditional reconfiguration.
- MN also indicates that the given CPAC configurations are only partial so that UE needs not to trigger SCG-RACH Access when performing PSCell change.
- On receiving CPAC command containing partial configuration UE continues to evaluate the CPAC execution condition. When CPAC execution condition is met, the following occurs.
  - The UE applies the target cell partial configuration and completes the target PSCell downlink synchronization.
  - After successful monitoring of common search space and rrm measurements at new cell, the UE continue to evaluate the CPAC configurations given earlier but with serving cell changed to new serving cell in the events.
  - The UE may not receive dedicated part of the CPAC configuration unless there is a reactivation need, either at the UE or the network side.
- On trigger for reactivation from UE, UE can directly trigger SCG-Access to the latest serving cell by using the common configuration it has already received as part of CPAC configuration.
- In case of reactivation trigger from MN, MN may additionally configure dedicated configuration based on the knowledge of the current serving cell.
- The UE may not receive dedicated part of the CPAC configuration unless there is a reactivation need, either at the UE or the network side.

In some implementations, obtaining the partial configuration for conditional mobility in RRC-INACTIVE state is as follows.

- SN can provide to the MN, the partial configuration which are mapped to CPAC common-configuration via non-UE associated signalling procedures such as XN-setup or XN-configuration-updates also. In this case MN needs not to trigger SCG-Modification procedure for triggering the conditional reselection event towards UE having SCG Deactivated.
- Change in the partial configuration part which is cell specific can also be updated to MN via non-UE associated XN signalling.

Key aspects of the improved technique include the following.

- Network configuration of CPAC to a UE, without dedicated UE configuration to enable faster SCG change scenario nullifying the signalling overhead, when SCG is in DEACTIVATED state.
- On meeting the CPAC execution condition set with partial configuration, the UE applies the received common configuration and continue to monitor the new serving cell for further RRM measurements related to measurement configuration given as part of partial CPAC configuration of new cell.
  - The UE informs the MN about the PSCell change along with the ID of the PSCell to which the UE has changed.
  - The UE need not trigger random access procedure in new cell to complete the conditional cell reselection procedure.
- On new PSCell serving cell, UE continues to evaluate the cell for which CPA configurations are provided earlier from MN also if there are applicable cells as per new cell measurement configuration.

Figure 4:
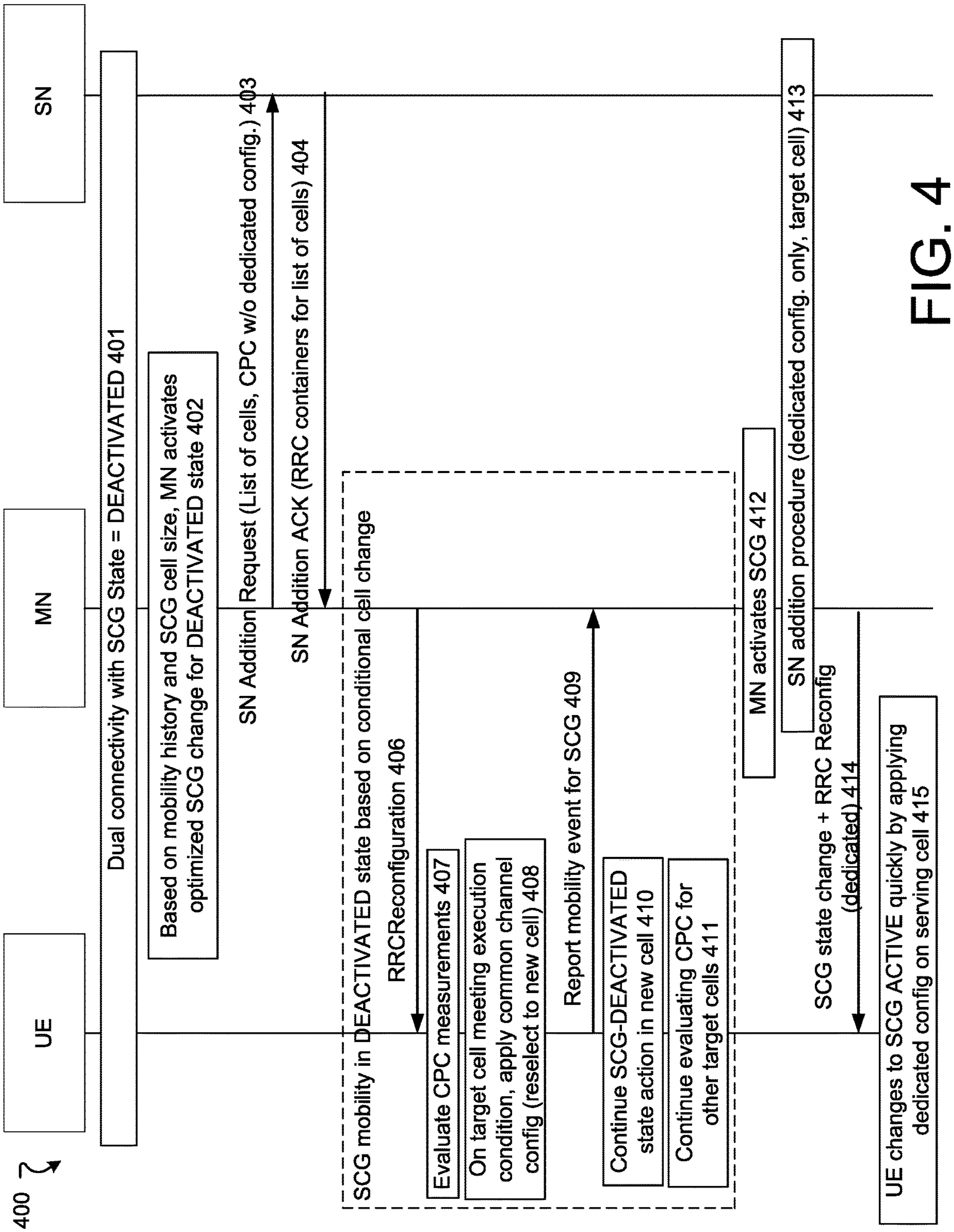
FIG. 4 is a sequence diagram illustrating an improved signalling procedure for changes to the PSCell of a deactivated SCG, according to an example implementation.

FIG. 4 is a sequence diagram illustrating an improved signalling procedure 400 for changes to the PSCell of a deactivated SCG.

At 401, a UE has dual connectivity with a MN and a SN such that the SCG associated with the SN is in a DEACTIVATED state.

At 402, the MN activates an optimized SCG charge for the DEACTIVATED state based on mobility history and SCG cell size.

At 403, the MN transmits an SN addition request to the SN. The request includes a list of cells and a CPC without a dedicated configuration.

At 404, the MN receives a SN addition acknowledgement from the SN. The acknowledgment includes RRC containers for the list of cells.

In 401-404, once a MN puts the SCG of the UE to deactivated state it may further consider, e.g., based on the mobility history of the UE, to assign a pool of cells for SCG mobility. This pool of cells does not have to offer any dedicated resources to the UE but only assist in cell-reselection-like-mobility without causing any dedicated random-access procedure and SCG.

406-411 are included in SCG mobility in DEACTIVATED state based on a conditional cell change.

At 406, the UE receives RRC Reconfiguration data from the MN.

At 407, the UE evaluates CPC measurements after receiving the RRC reconfiguration data.

At 408, in response to the target cell meeting an execution condition, the UE applies a common channel configuration to reselect to a new cell.

At 409, the UE transmits reporting data to the MN to report a mobility event for the SCG.

In 406-409, the network provides a common channel configuration to the UE which may be aligned to the information in the cell specific system information so as to allow the UE to perform measurements in the deactivated state but yet provide a measurement identity to allow the UE to report the mobility event as configured. In some implementations, 409 is not mandatory for each cell but rather could follow an approach in which the UE informs the MN every few cells in the pool. In some implementations, reusing the CPC framework will allow an easier path towards standardization.

At 410, the UE continues SCG-DEACTIVATED state action in a new cell.

At 411, the UE continues evaluating the CPC for other target cells.

In 410-411, as the UE moves into the new cell, it applies the common configuration provided for that cell and continues in the deactivated state. The UE also continues evaluating the CPC condition for other target cells.

At 412, the MN activates the SCG.

At 413, the MN and SN perform a SN addition procedure with a dedicated configuration only to add a target cell.

At 414, the MN communicates a SCG state change and RRC reconfiguration to the UE.

At 415, the UE changes to SCG ACTIVE by applying dedicated configuration on the serving cell.

In 412-415, in the case the MN decides to activate the SCG it provides the UE with the dedicated configuration of the current serving cell allowing the UE to quickly activate the SCG with the provided configuration.

In some implementations, in case the UE triggers the activation of the SCG, it may do so by contacting the MN after which 412-415 continue as in the previous sequence.

Figure 5:
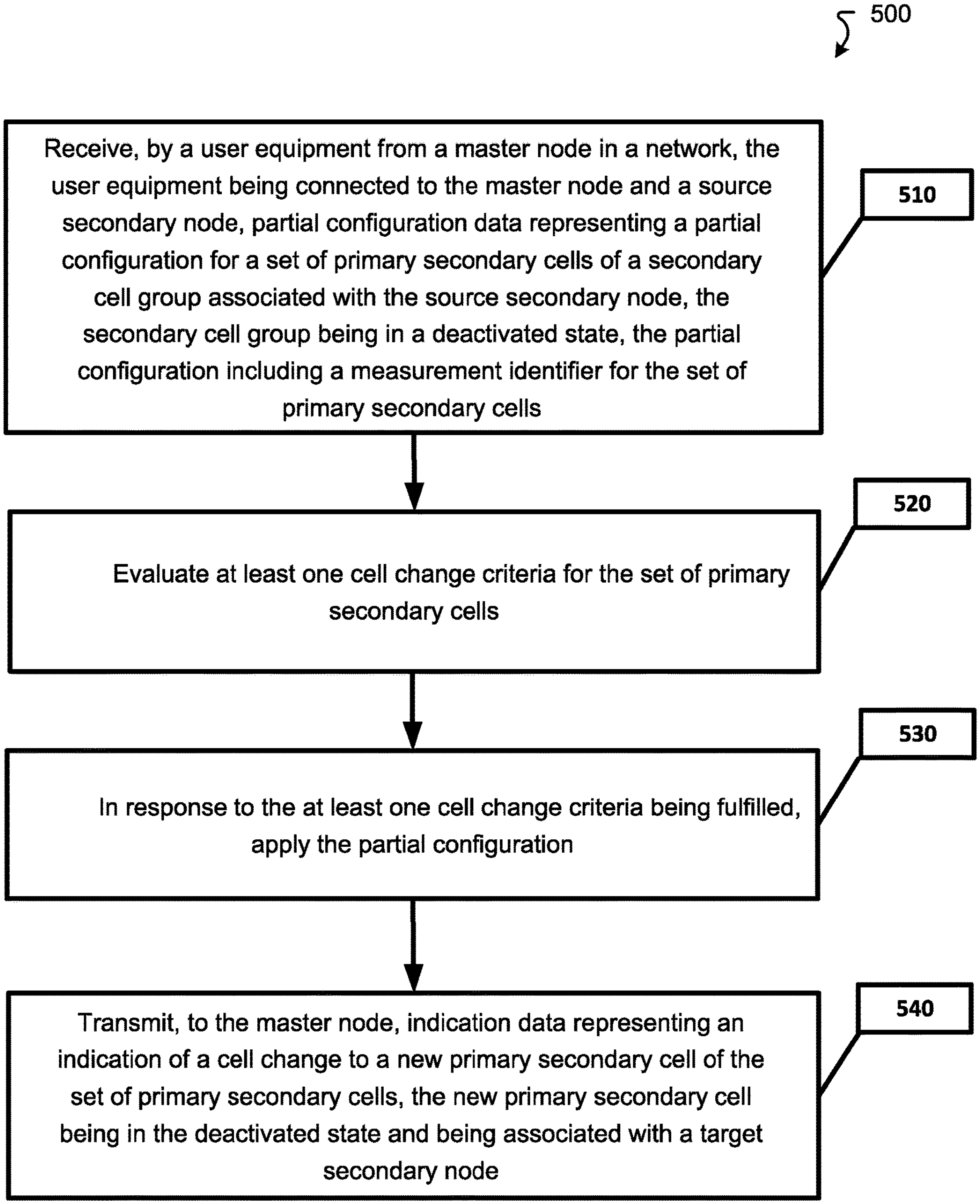
FIG. 5 is a flow chart illustrating a process of cell change in a SCG DEACTIVATED state according to an example implementation

Example 1-1: FIG. 5 is a flow chart illustrating a process 500 of cell change in a SCG DEACTIVATED state. Operation 510 includes receiving, by a user equipment from a master node in a network, the user equipment being connected to the master node and a source secondary node, partial configuration data representing a partial configuration for a set of primary secondary cells of a secondary cell group associated with the source secondary node, the secondary cell group being in a deactivated state, the partial configuration including a measurement identifier for the set of primary secondary cells. Operation 520 includes evaluating at least one cell change criteria for the set of primary secondary cells. Operation 530 includes, in response to the at least one cell change criteria being fulfilled, applying the partial configuration. Operation 540 includes transmitting, to the master node, indication data representing an indication of a cell change to a new primary secondary cell of the set of primary secondary cells, the new primary secondary cell being in the deactivated state and being associated with a target secondary node.

Example 1-2: According to an example implementation of Example 1-1, wherein the cell change includes a conditional primary secondary cell change, the conditional primary secondary cell addition change including configurations for common channel access without any dedicated configurations.

Example 1-3: According to an example implementation of Example 1-2, further comprising evaluating, as the cell change criteria, conditional primary secondary cell change criteria for a new set of primary secondary cells after applying the partial configuration.

Example 1-4: According to an example implementation of Example 1-3, wherein applying the partial configuration includes, in response to the conditional primary secondary cell change criteria being satisfied, applying the partial configuration to the new primary secondary cell to complete a downlink synchronization.

Example 1-5: According to an example implementation of Examples 1-3 to 1-4, wherein evaluating the conditional primary secondary cell addition change criteria for the new primary secondary cell includes monitoring the conditional primary secondary cell change criteria such that a serving cell for the user equipment is enabled to be changed to a new serving cell.

Example 1-6: According to an example implementation of Examples 1-3 to 1-5, wherein evaluating the conditional primary secondary cell addition change criteria for the new primary secondary cell includes determining a set of new primary secondary cells based on the evaluation of the conditional primary secondary cell change criteria.

Example 1-7: According to an example implementation of Examples 1-3 to 1-6, wherein evaluating the conditional primary secondary cell addition change criteria for the new primary secondary cell includes performing a radio link monitoring operation for the new primary secondary cell, the radio link monitoring operation including continuously measuring serving cell measurements to determine whether radio conditions in the new primary secondary cell will provide a satisfactory radio connection.

Example 1-8: According to an example implementation of Examples 1-1 to 1-7, wherein the partial configuration is applied when the master node or the source secondary node detects a high mobility event for the user equipment when the secondary cell group is in the deactivated state, the high mobility event includes at least one of an event in which the user equipment is detected moving at a velocity greater than a threshold or performs more primary or primary secondary cell changes than a predefined threshold in a given time interval.

Example 1-9: According to an example implementation of Examples 1-1 to 1-8, further comprising receiving dedicated configuration data representing a dedicated configuration for the set of primary secondary cells, the dedicated configuration changing the user equipment from the deactivated state to an activated state.

Example 1-10: According to an example implementation of Examples 1-1 to 1-9, further comprising detecting a data activity at the user equipment; and, in response to detecting the data activity at the user equipment, transmitting, to the master node, second indication data representing an indication of a change from the deactivated state to an activated state.

Example 1-11: An apparatus comprising means for performing a method of any of Examples 1-1 to 1-10.

Example 1-12: A computer program product including a non-transitory computer-readable storage medium and storing executable code that, when executed by at least one data processing apparatus, is configured to cause the at least one data processing apparatus to perform a method of any of Examples 1-1 to 1-10.

Figure 6:
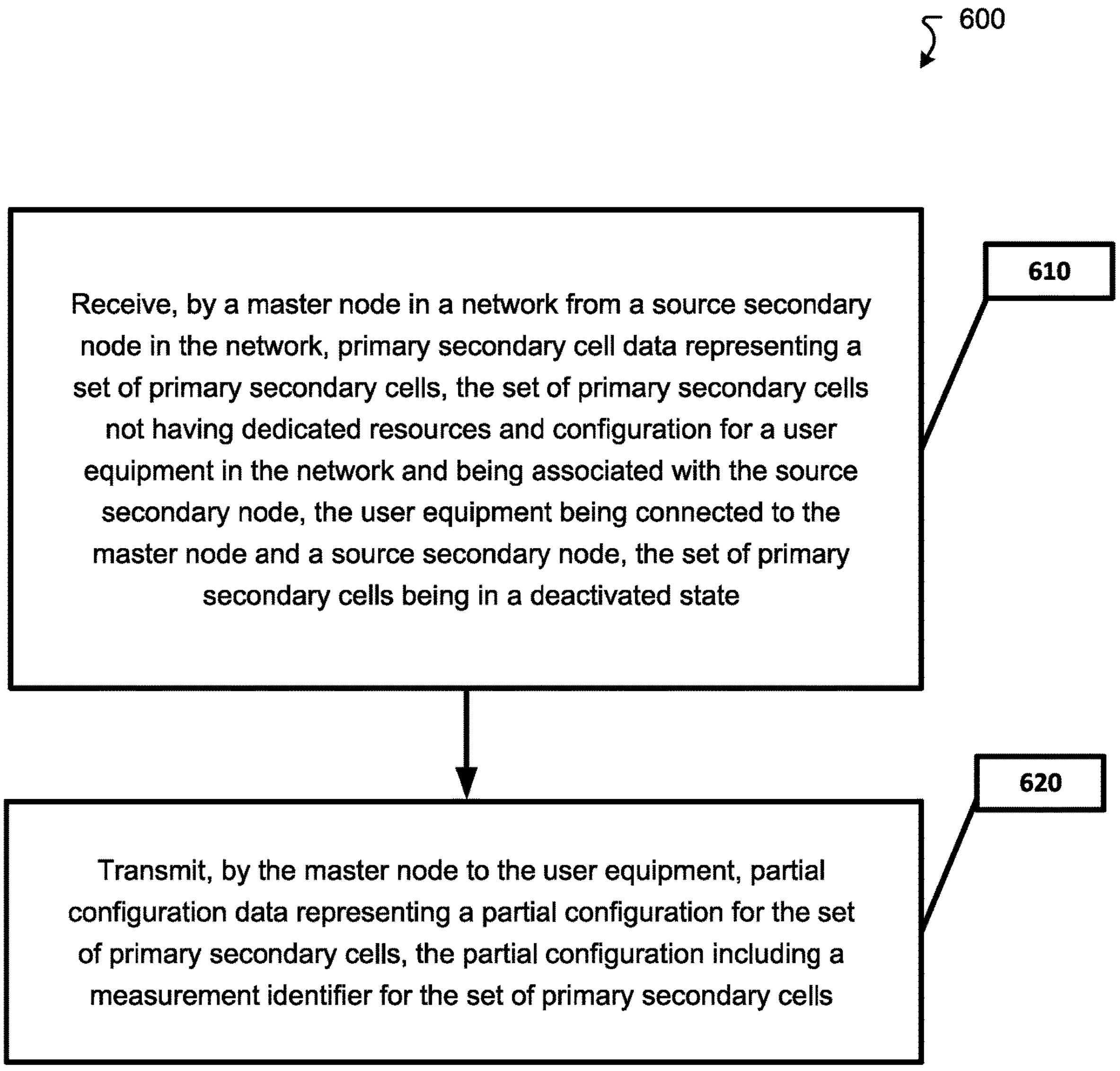
FIG. 6 is a flow chart illustrating a process of cell change in a SCG DEACTIVATED state according to an example implementation.

Example 2-1: FIG. 6 is a flow chart illustrating a process 600 of cell change in a SCG DEACTIVATED state. Operation 610 includes receiving, by a master node in a network from a source secondary node in the network, primary secondary cell data representing a set of primary secondary cells, the set of primary secondary cells not having dedicated resources and configuration for a user equipment in the network and being associated with the source secondary node, the user equipment being connected to the master node and a source secondary node, the set of primary secondary cells being in a deactivated state. Operation 620 includes transmitting, by the master node to the user equipment, partial configuration data representing a partial configuration for the set of primary secondary cells, the partial configuration including a measurement identifier for the set of primary secondary cells.

Example 2-2: According to an example implementation of Example 2-1, further comprising receiving, from the user equipment, mobility data representing a mobility event involving a cell change, the cell change occurring in response to at least one cell change criteria being met.

Example 2-3: According to an example implementation of Example 2-2, wherein the cell change criteria include conditional primary secondary cell change criteria for a new primary secondary cell after applying the partial configuration, the new primary secondary cell being associated with a target secondary node.

Example 2-4: According to an example implementation of Example 2-3, wherein the partial configuration is mapped to a common configuration via a non-user-equipment-associated signalling procedure.

Example 2-5: According to an example implementation of Examples 2-2 and 2-4, wherein the mobility event is a high mobility event, the high mobility event including an event in which the user equipment is detected moving at a velocity greater than a threshold.

Example 2-6: According to an example implementation of Examples 2-2 to 2-5, further comprising, in response to receiving the mobility data, transmitting indication data indicating the cell change to source secondary node to allow the source secondary node to provide a set of conditional cell change candidates.

Example 2-7: According to an example implementation of Examples 2-1 to 2-6, further comprising transmitting, to the user equipment, dedicated configuration data representing a dedicated configuration for the set of primary secondary cells, the dedicated configuration changing the user equipment from the deactivated state to an activated state.

Example 2-8: According to an example implementation of Examples 2-1 to 2-7, further comprising receiving, from the user equipment, second indication data representing an indication of a change from the deactivated state to an activated state, the second indication data being received in response to detecting data activity at the user equipment.

Example 2-9: An apparatus comprising means for performing a method of any of Examples 2-1 to 2-8.

Example 2-10: A computer program product including a non-transitory computer-readable storage medium and storing executable code that, when executed by at least one data processing apparatus, is configured to cause the at least one data processing apparatus to perform a method of any of Examples 2-1 to 2-8.

LIST OF EXAMPLE ABBREVIATIONS

Figure 7:
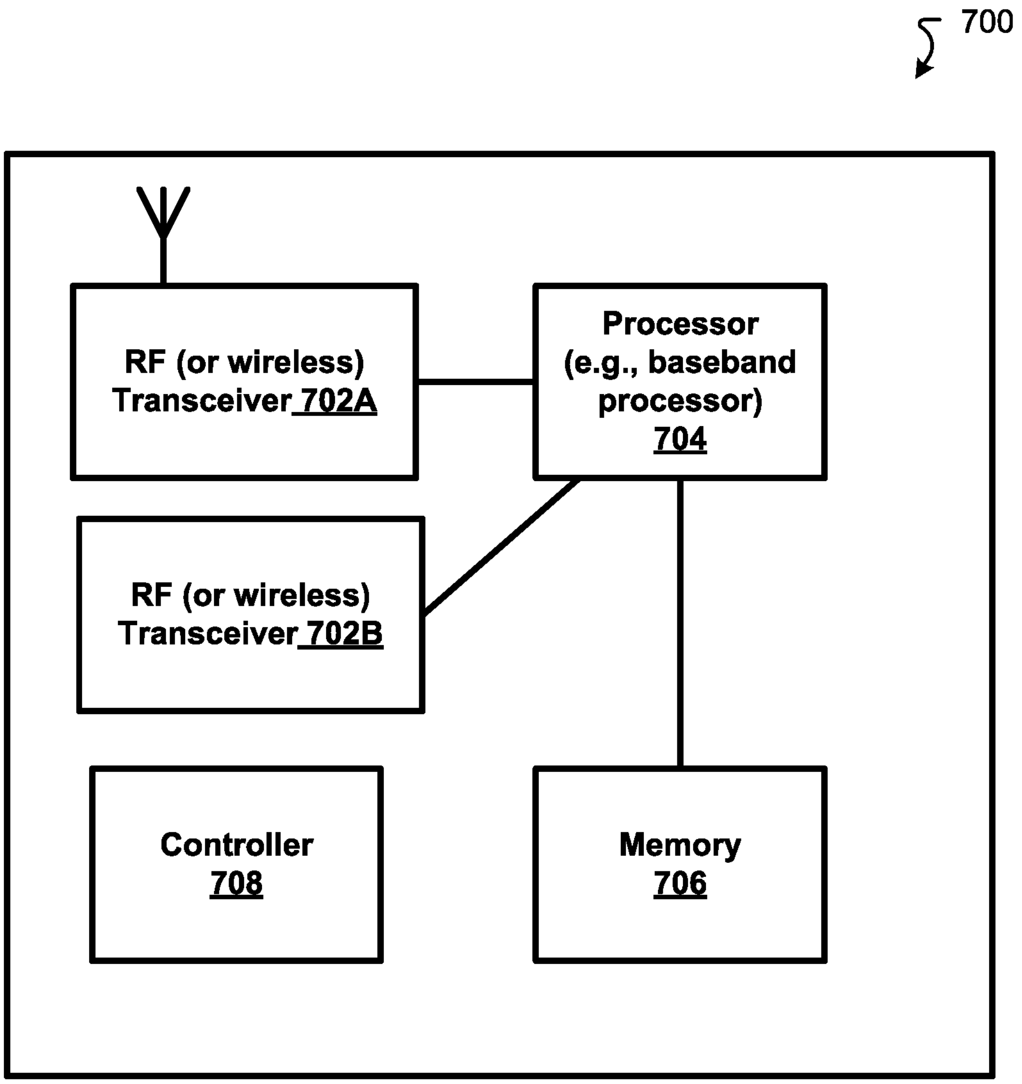
FIG. 7 is a block diagram of a node or wireless station (e.g., base station/access point, relay node, or mobile station/user device) according to an example implementation.

CPAC: Conditional PSCell Addition Change
HO: HandOver
MCG: Master Cell Group
MN: Master Node
RACH: Random Access CHannel
RRM: Radio Resource Management
SCG: Secondary Cell Group
SN: Secondary Node
UE: User Equipment FIG. 7 is a block diagram of a wireless station (e.g., AP, BS, e/gNB, NB-IoT UE, UE or user device) 700 according to an example implementation. The wireless station 700 may include, for example, one or multiple RF (radio frequency) or wireless transceivers 702A, 702B, where each wireless transceiver includes a transmitter to transmit signals (or data) and a receiver to receive signals (or data). The wireless station also includes a processor or control unit/entity (controller) 704 to execute instructions or software and control transmission and receptions of signals, and a memory 706 to store data and/or instructions.

Processor 704 may also make decisions or determinations, generate slots, subframes, packets or messages for transmission, decode received slots, subframes, packets or messages for further processing, and other tasks or functions described herein. Processor 704, which may be a baseband processor, for example, may generate messages, packets, frames or other signals for transmission via wireless transceiver 702 (702A or 702B). Processor 704 may control transmission of signals or messages over a wireless network, and may control the reception of signals or messages, etc., via a wireless network (e.g., after being down-converted by wireless transceiver 702, for example). Processor 704 may be programmable and capable of executing software or other instructions stored in memory or on other computer media to perform the various tasks and functions described above, such as one or more of the tasks or methods described above. Processor 704 may be (or may include), for example, hardware, programmable logic, a programmable processor that executes software or firmware, and/or any combination of these. Using other terminology, processor 704 and transceiver 702 together may be considered as a wireless transmitter/receiver system, for example.

In addition, referring to FIG. 7, a controller (or processor) 708 may execute software and instructions, and may provide overall control for the station 700, and may provide control for other systems not shown in FIG. 7 such as controlling input/output devices (e.g., display, keypad), and/or may execute software for one or more applications that may be provided on wireless station 700, such as, for example, an email program, audio/video applications, a word processor, a Voice over IP application, or other application or software.

In addition, a storage medium may be provided that includes stored instructions, which when executed by a controller or processor may result in the processor 704, or other controller or processor, performing one or more of the functions or tasks described above.

According to another example implementation, RF or wireless transceiver(s) 702A/702B may receive signals or data and/or transmit or send signals or data. Processor 704 (and possibly transceivers 702A/702B) may control the RF or wireless transceiver 702A or 702B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G uses multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IoT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall as intended in the various embodiments.

What is claimed is:

1. A user equipment comprising:

at least one processor; and at least one memory including computer program code; the at least one memory and the computer program code configured to cause the user equipment to perform the following operations:

receiving, from a master node (MN) in a network, partial configuration data representing a partial configuration for a set of primary secondary cells (PSCells) of a secondary cell group (SCG) associated with a source secondary node (SN), the SCG being in a deactivated state, the partial configuration including a single measurement identifier mapped to a Conditional PSCell Addition Change (CPAC) configuration that contains common-channel-access parameters and no dedicated configuration, wherein the user equipment is connected to the MN and the SN, and wherein the user equipment is operating in dual connectivity (DC) mode;

evaluating a single conditional primary secondary cell change criterion consisting of (i) completing downlink synchronization at a target primary secondary cell and (ii) performing a radio link monitoring (RLM) operation indicating that serving-cell measurements satisfy a predefined connection-quality threshold for the set PSCells;

based on the single conditional primary secondary cell change criterion being fulfilled, applying only the common-channel portion of the partial configuration to complete downlink synchronization with the target primary secondary cell while remaining in the deactivated state and without triggering a random access channel (RACH) procedure;

transmitting, to the MN, indication data consisting of an identifier of the target primary secondary cell representing an indication of a cell change to a new PSCell of the set of PSCells, the new PSCell being in the deactivated state and being associated with a target SN;

detecting data activity while the SCG remains in the deactivated state;

based on detecting the data activity, transmitting, to the MN, second indication data representing an indication of a change from the SCG being in the deactivated state to the SCG being in an activated state; and based on receiving, from the MN, a reconfiguration message including a dedicated configuration for a current serving PSCell, applying the dedicated configuration to activate the SCG.

2. The user equipment of claim 1, wherein the predefined connection-quality threshold of the RLM operation is an event in which a measured signal-to-noise ratio (SNR) of the target primary secondary cell exceeds a configured threshold value stored in the partial configuration.

3. The user equipment of claim 2, wherein the partial configuration is received from the MN based on non-user-equipment-associated Xn signaling between the MN and the source SN, the Xn signaling providing cell-specific updates to the conditional PSCell Addition Change (CPAC) configuration.

4. The user equipment of claim 3, wherein detecting data activity comprises detecting initiation of uplink data transmission by an application of the user equipment, the initiation causing the user equipment to transmit the second indication data to the master node (MN).

5. The user equipment of claim 4, wherein the second indication data transmitted to the MN consists solely of an identifier of the current serving PSCell and a request for activation of the SCG.

6. A system comprising:

a user equipment;

at least one processor; and at least one memory including computer program code; the at least one memory and the computer program code configured to cause the user equipment to perform the following operations:

receiving, from a master node (MN) in a network, partial configuration data representing a partial configuration for a set of primary secondary cells (PSCells) of a secondary cell group (SCG) associated with a source secondary node (SN), the SCG being in a deactivated state, the partial configuration including a single measurement identifier mapped to a Conditional PSCell Addition Change (CPAC) configuration that contains common-channel-access parameters and no dedicated configuration, wherein the user equipment is connected to the MN and the SN, and wherein the user equipment is operating in dual connectivity (DC) mode;

evaluating a single conditional primary secondary cell change criterion consisting of (i) completing downlink synchronization at a target primary secondary cell and (ii) performing a radio link monitoring (RLM) operation indicating that serving-cell measurements satisfy a predefined connection-quality threshold for the set PSCells;

based on the single conditional primary secondary cell change criterion being fulfilled, applying only the common-channel portion of the partial configuration to complete downlink synchronization with the target primary secondary cell while remaining in the deactivated state and without triggering a random access channel (RACH) procedure;

transmitting, to the MN, indication data consisting of an identifier of the target primary secondary cell representing an indication of a cell change to a new PSCell of the set of PSCells, the new PSCell being in the deactivated state and being associated with a target SN;

detecting data activity while the SCG remains in the deactivated state;

based on detecting the data activity, transmitting, to the MN, second indication data representing an indication of a change from the SCG being in the deactivated state to the SCG being in an activated state; and based on receiving, from the MN, a reconfiguration message including a dedicated configuration for a current serving PSCell, applying the dedicated configuration to activate the SCG.

7. The system of claim 6, wherein the predefined connection-quality threshold of the RLM operation is an event in which a measured signal-to-noise ratio (SNR) of the target primary secondary cell exceeds a configured threshold value stored in the partial configuration.

8. The system of claim 7, wherein the partial configuration is received from the MN based on non-user-equipment-associated Xn signaling between the MN and the source SN, the Xn signaling providing cell-specific updates to the conditional PSCell Addition Change (CPAC) configuration.

9. The system of claim 8, wherein detecting data activity comprises detecting initiation of uplink data transmission by an application of the user equipment, the initiation causing the user equipment to transmit the second indication data to the master node (MN).

10. The system of claim 9, wherein the second indication data transmitted to the MN consists solely of an identifier of the current serving PSCell and a request for activation of the SCG.

11. A method performed by a user equipment, the method comprising:

receiving, from a master node (MN) in a network, partial configuration data representing a partial configuration for a set of primary secondary cells (PSCells) of a secondary cell group (SCG) associated with a source secondary node (SN), the SCG being in a deactivated state, the partial configuration including a single measurement identifier mapped to a Conditional PSCell Addition Change (CPAC) configuration that contains common-channel-access parameters and no dedicated configuration, wherein the user equipment is connected to the MN and the SN, and wherein the user equipment is operating in dual connectivity (DC) mode;

evaluating a single conditional primary secondary cell change criterion consisting of (i) completing downlink synchronization at a target primary secondary cell and (ii) performing a radio link monitoring (RLM) operation indicating that serving-cell measurements satisfy a predefined connection-quality threshold for the set PSCells;

based on the single conditional primary secondary cell change criterion being fulfilled, applying only the common-channel portion of the partial configuration to complete downlink synchronization with the target primary secondary cell while remaining in the deactivated state and without triggering a random access channel (RACH) procedure;

transmitting, to the MN, indication data consisting of an identifier of the target primary secondary cell representing an indication of a cell change to a new PSCell of the set of PSCells, the new PSCell being in the deactivated state and being associated with a target SN;

detecting data activity while the SCG remains in the deactivated state;

based on detecting the data activity, transmitting, to the MN, second indication data representing an indication of a change from the SCG being in the deactivated state to the SCG being in an activated state; and based on receiving, from the MN, a reconfiguration message including a dedicated configuration for a current serving PSCell, applying the dedicated configuration to activate the SCG.

12. The method of claim 11, wherein the predefined connection-quality threshold of the RLM operation is an event in which a measured signal-to-noise ratio (SNR) of the target primary secondary cell exceeds a configured threshold value stored in the partial configuration.

13. The method of claim 12, wherein the partial configuration is received from the MN based on non-user-equipment-associated Xn signaling between the MN and the source SN, the Xn signaling providing cell-specific updates to the conditional PSCell Addition Change (CPAC) configuration.

14. The method of claim 13, wherein detecting data activity comprises detecting initiation of uplink data transmission by an application of the user equipment, the initiation causing the user equipment to transmit the second indication data to the master node (MN).

15. The method of claim 14, wherein the second indication data transmitted to the MN consists solely of an identifier of the current serving PSCell and a request for activation of the SCG.

* * * * *